United States Patent
Ziemer et al.

(10) Patent No.: US 10,166,854 B2
(45) Date of Patent: Jan. 1, 2019

(54) TRANSMISSION, HYBRID DRIVETRAIN AND DRIVETRAIN FOR AN ELECTRIC VEHICLE

(71) Applicant: ZF Friedrichshafen AG, Friedrichshafen (DE)

(72) Inventors: Peter Ziemer, Tettnang (DE); Raffael Kuberczyk, Ravensburg (DE); Christian Sibla, Eriskirch (DE); Andreas Beisswenger, Aulendorf (DE); Eckehard Münch, Bünde (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 25 days.

(21) Appl. No.: 15/102,161

(22) PCT Filed: Nov. 6, 2014

(86) PCT No.: PCT/EP2014/073872
§ 371 (c)(1),
(2) Date: Jun. 6, 2016

(87) PCT Pub. No.: WO2015/082164
PCT Pub. Date: Jun. 11, 2015

(65) Prior Publication Data
US 2016/0368360 A1    Dec. 22, 2016

(30) Foreign Application Priority Data

Dec. 6, 2013 (DE) .................. 10 2013 225 211
Dec. 20, 2013 (DE) .................. 10 2013 226 963

(51) Int. Cl.
*F16H 3/72* (2006.01)
*F16H 37/06* (2006.01)
(Continued)

(52) U.S. Cl.
CPC .............. *B60K 6/365* (2013.01); *B60K 6/445* (2013.01); *B60K 6/48* (2013.01); *B60K 6/547* (2013.01);
(Continued)

(58) Field of Classification Search
CPC ................................................ F16H 2200/2064
See application file for complete search history.

(56) References Cited

U.S. PATENT DOCUMENTS

| 7,811,191 B2 | 10/2010 | Iwase et al. | |
| 8,992,362 B2 * | 3/2015 | Ziemer | B60K 6/365 |
| | | | 475/5 |

(Continued)

FOREIGN PATENT DOCUMENTS

| DE | 102004042007 A1 | 3/2006 |
| DE | 102008040178 A1 | 1/2009 |

(Continued)

OTHER PUBLICATIONS

German Search Report DE102013226963.3, dated Oct. 10, 2014, (9 pages).

(Continued)

*Primary Examiner* — Tisha D Lewis
(74) *Attorney, Agent, or Firm* — Dority & Manning, P.A.

(57) ABSTRACT

A transmission includes a main gear set, an auxiliary gear set and an electric motor with a rotor and a stator. A third shaft of the main gear set is connected to a transmission output shaft, and a first shaft of the auxiliary gear set is connected to the rotor. When a second shaft of the auxiliary gear set is connected to a first shaft of the main gear set, a third shaft of the auxiliary gear set is constantly connected to the third shaft of the main gear set or a fourth shaft of the main gear set. When the second shaft of the auxiliary gear set is connected to the third shaft of the main gear set, the third (Continued)

shaft of the auxiliary gear set is constantly connected to the fourth shaft of the main gear set.

*22 Claims, 7 Drawing Sheets*

(51) Int. Cl.
    *B60K 6/365*      (2007.10)
    *B60K 6/48*      (2007.10)
    *B60K 6/547*      (2007.10)
    *B60K 6/445*      (2007.10)
    *F16H 3/66*      (2006.01)
    *B60K 6/26*      (2007.10)

(52) U.S. Cl.
CPC ............... *F16H 3/66* (2013.01); *F16H 3/725* (2013.01); *B60K 2006/264* (2013.01); *B60Y 2200/92* (2013.01); *B60Y 2400/73* (2013.01); *F16H 2200/006* (2013.01); *F16H 2200/2012* (2013.01); *F16H 2200/2023* (2013.01); *F16H 2200/2046* (2013.01); *F16H 2200/2064* (2013.01); *F16H 2200/2094* (2013.01); *F16H 2200/2097* (2013.01); *Y02T 10/6221* (2013.01); *Y10S 903/911* (2013.01); *Y10S 903/919* (2013.01)

(56) References Cited

U.S. PATENT DOCUMENTS

| | | | |
|---|---|---|---|
| 8,998,762 B2* | 4/2015 | Griesmeier | B60K 6/48 475/5 |
| 2007/0129196 A1 | 6/2007 | Bucknor et al. | |
| 2008/0171625 A1 | 7/2008 | Goldschmidt et al. | |
| 2009/0098968 A1 | 4/2009 | Maguire et al. | |
| 2013/0072339 A1* | 3/2013 | Zhang | F16H 3/62 475/159 |
| 2013/0090202 A1* | 4/2013 | Hiraiwa | B60K 6/365 475/5 |
| 2013/0196809 A1 | 8/2013 | Ziemer | |
| 2014/0182415 A1* | 7/2014 | Griesmeier | F16H 3/66 74/661 |

FOREIGN PATENT DOCUMENTS

| | | |
|---|---|---|
| DE | 102008051305 A1 | 12/2009 |
| DE | 102012201369 A1 | 8/2013 |
| DE | 102012201377 A1 | 8/2013 |

OTHER PUBLICATIONS

International Search Report (English Translation) PCT/EP2014/073872, dated Feb. 3, 2015, (2 pages).

* cited by examiner

| GEAR | C | B | D | E | A | F | EM | RATIO | GEAR STEP |
|---|---|---|---|---|---|---|---|---|---|
| 1VM +Parking Lock | | ● | | | | ● | M/Rek | 6.51 | 1.64 |
| 2VM | | ● | ● | | | ● | M/Rek | 3.97 | 1.56 |
| 3VM | | | ● | | | | M/Rek | 2.55 | 1.55 |
| 4VM | | ● | ● | | ● | | M/Rek | 1.64 | 1.25 |
| 5VM | | ● | | | ● | | M/Rek | 1.31 | 1.31 |
| 6VM | | | | ● | ● | | M/Rek | 1.00 | 1.34 |
| 7VM | | ● | | ● | | | M/Rek | 0.75 | 1.16 |
| 8VM | ● | | | | | | M/Rek | 0.64 | |
| 1EM | | | | | | ● | M/Rek | 7.00 | |
| 1S | | ● | | | | (●)* | EM, SG | | |
| 2S | | | | ● | | (●)* | EM, SG | | |

Overall Gear Ratio: 10.1

*Slow Start

Fig. 3

TRANSMISSION, HYBRID DRIVETRAIN AND DRIVETRAIN FOR AN ELECTRIC VEHICLE

FIELD OF THE INVENTION

The invention relates generally to a transmission with a transmission input shaft and a transmission output shaft, a main gear set, an auxiliary gear set, and an electric motor with a rotor and a stator, whereas the transmission comprises a first power path and a second power path between the transmission input shaft and the main gear set, whereas the main gear set features a first and a second planetary gear set with a total of four shafts designated in the order of rotational speeds as the first, second, third and fourth shafts, whereas the first power path is connectable through a first shift element to the fourth shaft of the main gear set and through a second shift element to the second shaft of the main gear set, whereas the second power path is connectable through a third shift element to the first shaft of the main gear set and through a fourth shift element to the second shaft of the main gear set, whereas the third shaft of the main gear set is connected to the transmission output shaft, whereas the auxiliary gear set features a planetary gear set with a first, second and third shafts, and whereas the first shaft of the auxiliary gear set is constantly connected to the rotor. The invention also relates generally to a drive train for a motor vehicle with a transmission.

BACKGROUND

Herein, a transmission in particular designates a multi-speed transmission, with which a predetermined number of gears, thus fixed transmission ratio relationships between a transmission input shaft and the transmission output shaft, are automatically shiftable byshift elements. Under certain circumstances, such a transmission may also have a variable transmission ratio between the transmission input shaft and the transmission output shaft. Herein, the shift elements comprise, for example, clutches or brakes. Such transmissions are primarily used in automotive applications, in order to adjust the rotational speed and torque output capabilities of the drive unit to the driving resistance of the motor vehicle in a suitable manner.

From patent application DE 10 2012 201 377 A1 of the applicant, a transmission with a transmission input shaft and a transmission output shaft, and two power paths between the transmission input shaft and a main gear set with two individual planetary gear sets, with four shafts designated in the order of rotational speeds as the first, second, third and fourth shafts is known, whereas the third of the four shafts is connected to the transmission output shaft. An electric motor is connected through a planetary transmission at the first shaft of the main gear set.

The task of the invention is to improve the load-shifting behavior of the transmission known in the state of the art.

An additional task of the invention is to improve the operating range of the transmission, such that, in any gear, the electric motor is able to receive mechanical power from the transmission output shaft or deliver power to it.

SUMMARY OF THE INVENTION

A transmission includes at least one transmission input shaft and a transmission output shaft, a main gear set, an auxiliary gear set, and an electric motor with a rotor and a stator.

The main gear set features a first and a second planetary gear set with a total of four shafts designated in the order of rotational speeds as the first, second, third and fourth shafts. The main gear set is thus formed as a two-carrier/four-shaft transmission. The auxiliary gear set features a planetary gear set with a total of three shafts designated as the first, second and third shafts. The first shaft of the auxiliary gear set is constantly connected to the rotor.

A "two-carrier/four-shaft transmission" is understood to be a planetary transmission that is formed from two individual planetary gear sets kinematically coupled with each other through exactly two coupling shafts, and with which four of its elements ("shafts") are freely accessible for other transmission elements. Thereby, a coupling shaft is defined as a constant mechanical connection between one element—thus, a sun gear or a carrier or a ring gear—of the first individual planetary gear set with one element—thus, a sun gear or a carrier or a ring gear—of the second individual planetary gear set. The number of individual planetary gear sets and the number of free shafts are not defined by the visual appearance of the transmission, but through its kinematics. In each gear of a two-carrier/four-shaft transmission, two of the shift elements of the transmission connected to elements of the two-carrier/four-shaft transmission must be locked. For the graphical representation of the kinematics of the transmission, a rotational speed diagram of the transmission (for example, the Kutzbach diagram known from transmission theory) is typically used. Known embodiments of such a two-carrier/four-shaft transmission include the so-called "Ravigneaux gear set" and the so-called "Simpson gear set."

A reduced two-carrier four-shaft transmission is a structural shape of a two-carrier/four-shaft transmission in which one element—that is, a sun gear, a carrier or a ring gear—of the transmission is spared, since another element of the transmission takes over its task, without thereby changing the kinematics. That element that takes over the function of the spared element is thus one of the coupling shafts of the transmission at the same time. A known embodiment of this is the Ravigneaux gear set, which features either two sun gears and only one ring gear, or two ring gears and only one sun gear.

The transmission features two power paths between the transmission input shaft and the main gear. Thereby, the two power paths feature a different transmission ratio relationship for the transmission input shaft. The different transmission ratio relationship is achieved by an upstream gear set that is formed as a planetary gear set. The first power path is connected through a first shift element to the fourth shaft of the main gear set and through a second shift element to the second shaft of the main gear set. The second power path is connected through a third shift element to the first shaft of the main gear set and through a fourth shift element to the second shaft of the main gear set.

In accordance with aspects of the invention, the second shaft of the auxiliary gear set is constantly connected to the first or third shaft of the main gear set. If the second shaft of the auxiliary gear set is connected to the first shaft of the main gear set, the third shaft of the auxiliary gear set is constantly connected to the third or fourth shaft of the main gear set. If the second shaft of the auxiliary gear set is connected to the third shaft of the main gear set, the third shaft of the auxiliary gear set is constantly connected to the fourth shaft of the main gear set.

Upon use of a motor vehicle, the transmission input shaft is connectable to a shaft of a drive unit, or is connectable through a clutch, such that mechanical power of the drive unit can be supplied to the transmission input shaft. The drive unit may be formed as an internal combustion engine and as an electric motor. The transmission output shaft serves as an interface for transferring mechanical power to the drive wheels of the motor vehicle.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

A planetary gear set comprises a sun gear, a carrier and a ring gear. Planetary gears, which mesh with the toothing of the sun gear and/or with the toothing of the ring gear, are rotatably mounted on the carrier. In the following, a negative gear set describes a planetary gear set with a carrier, on which the planetary gears are rotatably mounted, with a sun gear and a ring gear, whereas the toothing of at least one of one of the planetary gears meshes both with the toothing of the sun gear and with the toothing of the ring gear, by which the ring gear and the sun gear rotate in opposite directions of rotation, if the sun gear rotates with a fixed carrier.

Both sun gear and ring gear of a planetary gear set can also be divided into several segments. For example, it is conceivable that the planetary gears mesh with two sun gears, which are not connected to each other. Of course, the rotational speed relationships are identical on both segments of the sun gear, as if they were connected to each other.

A positive gear set differs from the negative planetary gear set just described in that the positive gear set features inner and outer planetary gears, which are rotatably mounted on the carrier. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed carrier, the ring gear and the sun gear rotate in the same direction of rotation.

The stationary transmission ratio defines the rotational speed relationship between the sun gear and ring gear of a planetary gear with a torque-proof carrier. Since, with a negative gear set, the direction of rotation between the sun gear and ring gear with a torque-proof carrier is reversed, the stationary transmission ratio always increases to a negative value with a negative gear set.

In the rotational speed diagram, the rotational speed relationships of the individual shafts are plotted in a vertical direction. The horizontal gaps between the shafts arise from the transmission ratio relationships between the shafts, such that rotational speed relationships and torque relationships of the shafts pertaining to a given operating point can be connected by a straight line. The transmission ratio relationships between the shafts arise from the stationary transmission ratios of the planetary gear sets involved. The rotational speed diagram can be presented, for example, in the form of a Kutzbach diagram.

Four shafts designated in the order of rotational speeds as the first, second, third and fourth shafts are characterized in that the rotational speeds of such shafts in the specified sequence increase, decrease or are equal in a linear manner. In other words, the rotational speed of the first shaft is less than or equal to the rotational speed of the second shaft. In turn, the rotational speed of the second shaft is less than or equal to the rotational speed of the third shaft. The rotational speed of the third shaft is less than or equal to the rotational speed of the fourth shaft. This sequence is also reversible, such that the first shaft features the highest rotational speed, while the fourth shaft assumes a rotational speed that is less than or equal to the rotational speed of the first shaft. Thereby, there is always a linear relationship between the rotational speeds of all four shafts.

Thereby, the rotational speed of one or more shafts also assume negative values, or even the value of zero. Therefore, the order of rotational speeds is always to refer to the signed value of the rotational speeds, and not to their amount or magnitude.

The rotational speeds of the four shafts are equal if, of the elements ring gear, carrier and sun of one of the planetary gear sets, two of such elements are connected to each other.

An electric motor consists at least of one torque-proof stator and one rotatably mounted rotor, and, during engine mode, is configured to convert electrical energy into mechanical energy in the form of rotational speed and torque, and, during generator mode, to convert mechanical energy into electrical energy in the form of current and voltage.

Through shift elements, depending on their operating state, a relative movement between two components is enabled, or a connection for the transmission of a torque between the two components is established. A "relative movement" is understood as, for example, a rotation of two components, whereas the rotational speed of the first component and the rotational speed of the second component differ from each other. In addition, the rotation of only one of the two components is conceivable, while the other component is at a standstill or rotates in the opposite direction. In the subject invention, the shift elements are preferably designed as claw-shift elements, which establish the connection by a positive connection.

Two elements are referred to as connected to each other particularly if there is a fixed (in particular, torque-proof) connection between the elements. Such connected elements rotate with the same rotational speed. The various components and elements of the specified invention may be connected to each other through a shaft or through a locked shift element or a connection element, or also directly, for example by a welded connection, a crimping connection or another connection.

Furthermore, two elements are described as connectable if there is a detachably torque-proof connection between such elements. If the connection exists, such elements rotate with the same rotational speed.

A shifting process is effected by locking a shift element of the transmission that was previously not located in the power flow of the transmission, and opening a shift element of the transmission previously located in the power flow of the transmission. The shifting process may also be undertaken under load, that is without a complete withdrawal of the torque at the transmission input shaft and the transmission output shaft. Such a shifting process is hereinafter referred to as a "load shift." With the use of claw-shift elements, a requirement for a load shift is that the shift element to be released is guided into a state that is at least nearly load-free prior to its release. The guiding into the state that is nearly load-free is achieved by the fact that the shift element is made largely free of torque, such that, through the shift element, no torque or only a small torque is transferred. For this purpose, through the electric motor, a torque is applied at that shaft with which the shift element to be released establishes a connection.

Through the connection in accordance with aspects of the invention of the rotor to the main gear set, it is thereby achieved that the transmission ratio of the rotor at the shafts of the main gear set is increased. If the second shaft of the auxiliary gear set is connected to the first shaft of the main gear set, through the connection in accordance with aspects of the invention, the first shaft of the main gear set is always located in the rotational speed plan between first shaft of the auxiliary gear set and the second shaft of the main gear set. If the second shaft of the auxiliary gear set is connected to the third shaft of the main gear set, through the suitable selection of the stationary transmission ratio of the planetary gear set of the main gear set, it can also be achieved that, in the rotational speed diagram, the first shaft of the main gear set is located between the first shaft of the auxiliary gear set and the second shaft of the main gear set. Through this enlarged transmission ratio, the torque to be applied by the rotor during the shifting process is reduced, by which the electric motor can be constructed smaller and lighter. In such a manner, with a load shift, the scaled-down electric motor may, even with a high torque at the transmission input shaft, apply the necessary torque, without leading to an undesirably high reduction in torque at the transmission output shaft. The enlarged transmission ratio is also useful if the torque of the electric motor is to be transferred to the transmission output shaft (for example, when using the transmission in a motor vehicle), by which an electric driving mode of the motor vehicle is enabled. Through the transmission ratio enlarged in such a manner, a start-up of the motor vehicle into an incline is possible even with a scaled-down electric motor. The enlarged transmission ratio is also useful if, starting from the electric motor, a torque is transferred to the transmission input shaft, for example when used for starting an internal combustion engine that is connected to the transmission input shaft. Moreover, the enlarged transmission ratio leads to the fact that the electric motor is smaller, and thus can be more easily built.

Through the allocation in accordance with aspects of the invention of the shafts of the main gear set to the second and third shafts of the auxiliary gear set, it is also achieved that the rotor, even with a torque-proof fixing of one of the shafts of the main gear set, is able to assume a rotational speed. The assumption of a rotational speed is a prerequisite for the receiving and delivering of mechanical power by the electric motor. It is thereby enabled that the electric motor is capable of receiving or delivering mechanical power in those gears in which, for example, the first shaft of the main gear set is fixed in a torque-proof manner or does not have an appreciable rotational speed. This is particularly advantageous when using the transmission in a motor vehicle, since kinetic energy of the motor vehicle can be recuperated in each gear of the transmission through the generator mode of the electric motor. If an internal combustion engine is connected to the transmission input shaft, the load point of the internal combustion engine can also be displaced in any gear by the generator mode or engine mode of the electric motor. Thus, the transmission enables an increase in efficiency of the motor vehicle.

Preferably, a sun gear of the planetary gear set of the auxiliary gear set is a component of the first shaft of the auxiliary gear set. In the event that the planetary gear set of the auxiliary gear set is formed as a negative gear set, a carrier of the planetary gear set of the auxiliary gear set is a component of the second shaft of the auxiliary gear set, and a ring gear of the planetary gear set of the auxiliary gear set is a component of the third shaft of the auxiliary gear set. If the planetary gear set of the auxiliary gear set is formed as a positive gear set, the allocation of the ring gear and the carrier is interchanged, such that the ring gear of the planetary gear set of the auxiliary gear set is a component of the second shaft of the auxiliary gear set, and the carrier of the planetary gear set of the auxiliary gear set is a component of the third shaft of the auxiliary gear set. In doing so, the rotational speed of the second shaft of the auxiliary gear set is always between the rotational speeds of the first and third shafts of the auxiliary gear set, if the specified elements of the planetary gear set of the auxiliary gear set do not circulate with the same rotational speed.

Through the multiple number of options offered for the connection between the rotor, the auxiliary gear set and the main gear set, aspects of the invention are particularly easily adjustable for various transmission variants and available installation space ratios.

The first shaft of the main gear set can be fixed in a torque-proof manner through a fifth shift element. The fourth shaft of the main gear set can be fixed in a torque-proof manner through a sixth shift element. Accordingly, through the fifth and sixth shift elements, a fixed connection to a transmission housing of the transmission, or to a different component of the transmission that is fixed in a torque-proof manner, can be established. Together with the arrangement of the first to fourth shift elements, this arrangement results in a particularly advantageous allocation of the individual gears.

The sequence of the four shafts of the main gear set in the rotational speed diagram depends on the manner in which shafts are allocated to which elements of the first and second planetary gear sets of the main gear set, and which of the four shafts are connected to each other. Examples of this are known in the state of the art, but certain variations have emerged as particularly advantageous for implementation in a transmission. These are particularly advantageous based on a geometrically favorable arrangement, based on reduced component stress and based on improved accessibility to the shift elements.

In accordance with a particularly preferred variant, the first shaft of the main gear set is connected to the sun gears of the first and second planetary gear sets of the main gear set. The second shaft of the main gear set is connected to the carrier of the second planetary gear set of the main gear set. The third shaft of the main gear set is connected to the carrier of the first planetary gear set and to the ring gear of the second planetary gear set of the main gear set. The fourth shaft of the main gear set is connected to the ring gear of the first planetary gear set of the main gear set. Thereby, the first and second planetary gear sets are formed as negative gear sets.

In order to simplify the connection between the third shaft of the main gear set and the transmission output shaft, the ring gear of the first planetary gear of the main gear set is divided into a first segment and a second segment. Both segments preferably feature the same effective diameter, by which the same kinematic conditions of the planetary gear set act on both segments. Both segments are components of the fourth shaft of the main gear set. The first segment is connected to that section of the fourth shaft of the main gear set that can be fixed in a torque-proof manner by the sixth shift element. The second segment is connected to that section of the fourth shaft of the main gear set that is connectable through the first shift element to the first power path.

Between the two segments of the ring gear of the first planetary gear set of the main gear set, one section of the third shaft of the main gear set leads radially outwards. Thereby, the connection of the third shaft to the transmission output shaft is facilitated, in particular if the transmission output shaft is coaxial to the transmission input shaft. This is particularly advantageous with a use of the transmission in a motor vehicle as a component of a drive train arranged in a manner longitudinal to the direction of travel.

Preferably, all six shift elements are formed as claw-shift elements, which establish the connection through form closure. Claw-shift elements are characterized by a negligible loss of power in the open state, by which the efficiency of the transmission is significantly improved.

Through the selective meshing of the six shift elements in pairs, eight forward gears can be realized. A first forward gear is formed from the locking of the third shift element and the sixth shift element. A second forward gear is formed from the locking of the fourth shift element and the sixth shift element. A third forward gear is formed from the locking of the third shift element and the fourth shift element. A fourth forward gear is formed from the locking of the fourth shift element and the first shift element. A fifth forward gear is formed from the locking of the third shift element and the first shift element. A sixth forward gear is formed from the locking of the second shift element and the first shift element. A seventh forward gear is formed from the locking of the third shift element and the second shift element. An eighth forward gear is formed from the locking of the fifth shift element and the second shift element.

If only the sixth shift element is locked, there is no connection between the transmission input shaft and the transmission output shaft. However, by operating the electric motor, power is transferable between the electric motor and the transmission output shaft. In such a manner, an electrical gear is formed, which, with a reverse rotation of the rotor of the electric motor, also serves as a reverse gear. Thus, a separate reverse gear may be omitted.

Preferably, the transmission may be a component of a hybrid drive train of a motor vehicle. The hybrid drive train features an internal combustion engine, in addition to the transmission. The internal combustion engine is connected or connectable, either directly or through a clutch, to the transmission input shaft of the transmission. The motor vehicle may be driven by both the internal combustion engine and the electric motor of the transmission. Optionally, the transmission features an auxiliary electric motor, which is configured to deliver torque through its rotor to the crankshaft of the internal combustion engine and, in such a way, start the internal combustion engine. This has the advantage that the internal combustion engine can be started by the auxiliary electric motor, without having any influence on a simultaneous electric driving mode, by the motor vehicle being driven solely by the electric motor of the transmission. If the hybrid drive train features a clutch between the transmission and the internal combustion engine and an auxiliary electric motor, the auxiliary electric motor is preferably arranged in the power flow between the internal combustion engine and the clutch. The clutch may feature a variable torque transfer capacity.

The electric motor is thereby connected to a converter, through which the electric motor is connected to an energy storage device. For this purpose, any form of energy storage device (in particular, an electrochemical, electrostatic, hydraulic or mechanical energy storage device) is suitable.

In an additional embodiment, the transmission may also be a component of a drive train of an electric motor vehicle. An electric motor vehicle is driven solely by one or more electric motors, and accordingly has no internal combustion engine. In this case, a traction electric motor is connected to the transmission input shaft. Through the different transmission ratio stages of the transmission, the traction electric motor may always be operated in an operating range with a high degree of efficiency, by which the energy efficiency of the entire electric motor vehicle is improved.

BRIEF DESCRIPTION OF THE DRAWINGS

Embodiments of the invention are described in detail on the basis of the attached figures.

FIG. 3 shows a shifting diagram of the transmission in accordance with the first and second exemplary embodiments.

DETAILED DESCRIPTION

Figure 1:
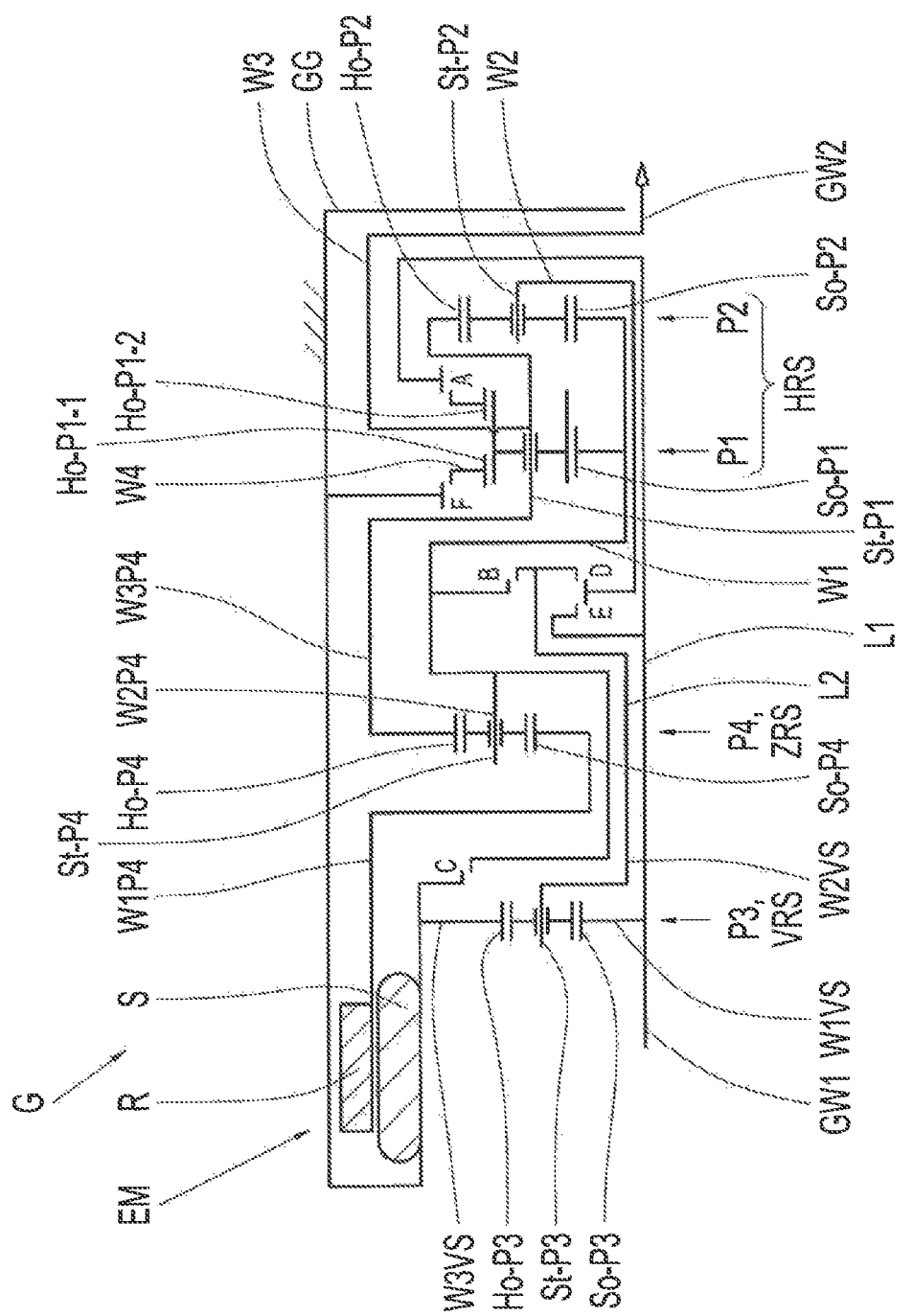
FIG. 1 schematically shows a transmission in accordance with a first exemplary embodiment of the invention.
Figure 1A:
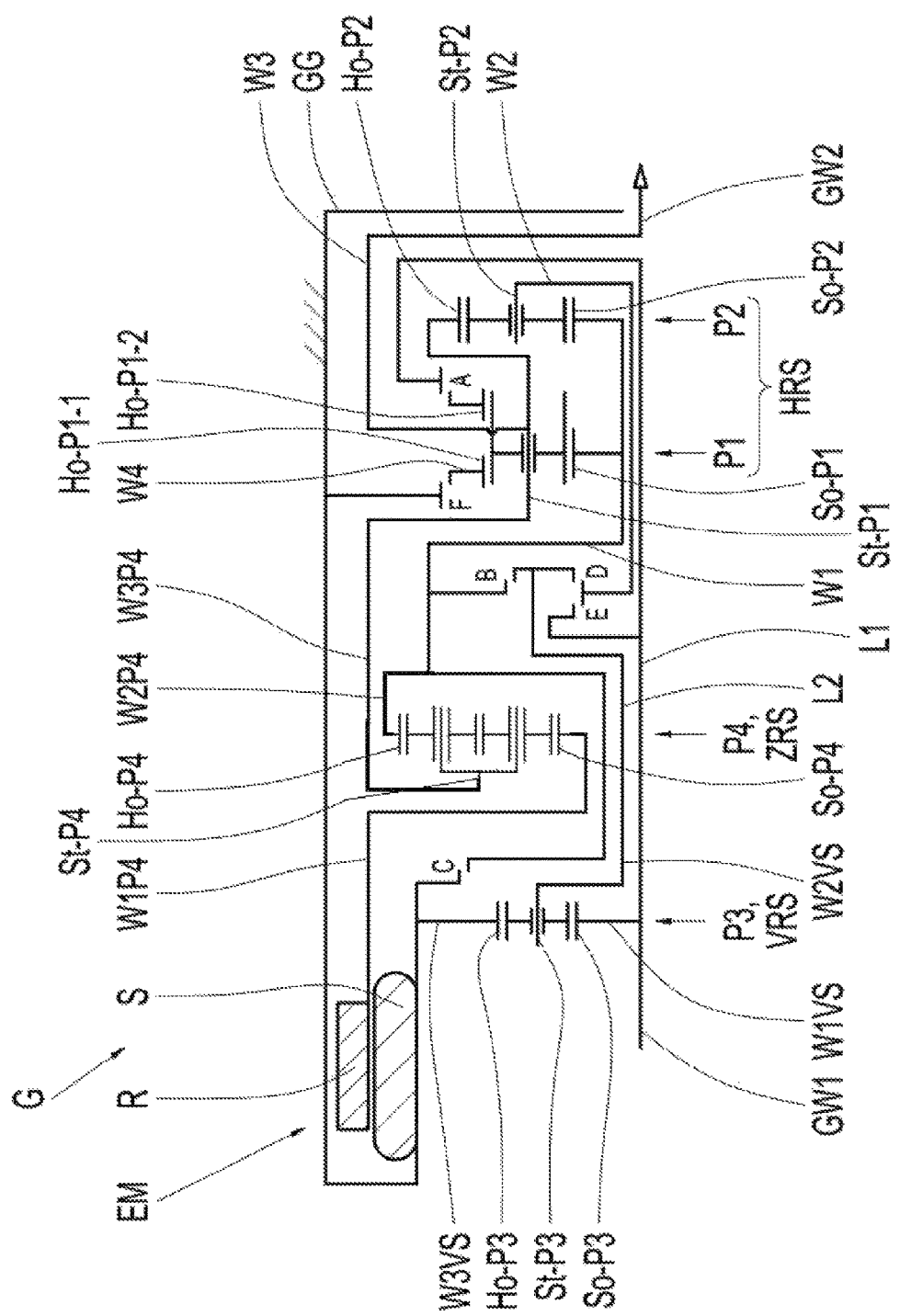
FIG. 1a schematically shows a transmission in accordance with another example embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

At the outset, it must be stated that, in the various described embodiments, the same parts are provided with the same reference signs or the same component names, whereby the disclosures contained throughout the description can be transferred analogously to the same parts with the same reference signs or the same component names.

FIG. 1 schematically shows a transmission G in accordance with a first exemplary embodiment of the invention. The transmission G features an upstream gear set VRS, an auxiliary gear set ZRS and a main gear set HRS. The upstream gear set VRS features a planetary gear set P3, and the auxiliary gear set ZRS features a planetary gear set P4. while the main gear set HRS features a first planetary gear set P1 and a second planetary gear set P2. All planetary gear set P1, P2, P3, P4 are formed as negative gear sets.

The presentation of the transmission G essentially shows the connectable and connected elements of the transmission G. Conclusions regarding the transmission ratio relationships cannot be drawn by the distances selected in the presentation of the transmission G.

A transmission input shaft GW1 is connected to a sun gear So-P3 of the first planetary gear set P3 of the upstream gear set VRS, while a ring gear Ho-P3 of the first planetary gear set P3 of the upstream gear set VRS is connected in a torque-proof manner to the transmission housing GG of the transmission G, or to a different component the transmission G that is fixed in a torque-proof manner. In such a way, a first and a second power path L1, L2 are formed, whereas power from the transmission input shaft GW1 can be transferred to the main gear set HRS through both the first power path L1 and through the second power path L2. The second power path L2 thereby transmits to the main gear set HRS a rotational speed that is changed compared to the rotational speed of the transmission input shaft GW1, by translating the rotational speed at the transmission input shaft GW1 by the transmission ratio between the sun gear So-P3 and a carrier St-P3 of the first planetary gear set P3 of the upstream gear set VRS. The first power path L1 transmits the rotational speed of the transmission input shaft GW1 without a transmission ratio to the main gear set HRS. Thereby, the sun gear So-P3 of the first planetary gear set P3 of the upstream gear set VRS is a component of a first shaft W1VS of the upstream gear set VRS, which is connected to the transmission input shaft GW1. The carrier St-P3 of the first planetary gear set P3 of the upstream gear set VRS is a component of a second shaft W2VS of the upstream gear set VRS. That component on which the ring gear Ho-P3 of the first planetary gear set P3 of the upstream gear set VRS is supported is referred to as the third shaft W3VS of the upstream gear set VRS.

The sun gear So-P1 of the first planetary gear set P1 and the sun gear So-P2 of the second planetary gear set P2 of the main gear set HRS are connected to each other, and are components of a first shaft W1 of the main gear set HRS. A carrier St-P1 of the first planetary gear set P1 of the main gear set HRS is connected to a ring gear Ho-F2 of the second planetary gear set P2 of the main gear set HRS and in such a way is a component of a third shaft W3 of the main gear set HRS. A ring gear Ho-P1 of the first planetary gear set P1 of the main gear set HRS is designed in two parts, and thus features a first segment Ho-P1-1 and a second segment Ho-P1-2, Both segments Ho-P1-1, Ho-P1-2 are components of a fourth shaft W4 of the main gear set HRS. One section of the third shaft W3 of the main gear set HRS runs between the two segments Ho-P1-1, Ho-P1-2 of the ring gear Ho-P1 and thus leads to a transmission output shaft GW2, which, in the exemplary embodiment shown, is coaxial to the transmission input shaft GW1. A carrier St-P2 of the second planetary gear set P2 of the main gear set HRS is a component of a second shaft W2 of the main gear set HRS. Through this arrangement and connection of the individual components of the first and second planetary gear sets P1, P2 of the main gear set HRS, the arrangement of the first, second, third and fourth shafts W1, W2, W3, W4 of the main gear set HRS in the rotational speed diagram is determined, whereas the sequence of first, second, third, fourth shafts W1, W2, W3, W4 corresponds to their sequence in the rotational speed diagram.

The first power path L1 is connectable through a first shift element A to the fourth shaft W4 of the main gear set HRS and through a second shift element E to the second shaft W2 of the main gear set HRS. The second power path L2 is connectable through a third shift element B to the first shaft W1 of the main gear set HRS and through a fourth shift element D to the second shaft W2 of the main gear set HRS. The first shaft W1 of the main gear set HRS is connectable through a fifth shift element C to the transmission housing GG of the transmission G, or to another torque-proof component of the transmission G, such that, with a locked fifth shift element C, the first shaft W1 of the main gear set HRS cannot assume any rotational speed. In the same manner, the fourth shaft W4 of the main gear set HRS can be fixed in a torque-proof manner through a sixth shift element F, by connecting the fourth shaft W4 through the sixth shift element F to the transmission housing GG.

In each case, two shift elements can be actuated by a double-acting shift device. The second and fourth shift elements E, D can be actuated through a first shift device. The third and the fifth shift elements B, C can be actuated through a second shift device. The first and sixth shift elements A, F can be actuated through a third shift device.

Thereby, each of the three shift devices may occupy three states. In a first shifting state of the shift device, the first shift element allocated to the shift device is in a locked position, while the second shift element allocated to the shift device occupies an open position. In a second shifting state of the shift device, the second shift element allocated to the shift device is in a locked position, while the first shift element allocated to the shift device occupies an open position. In a third shifting state, the two shift elements allocated to the shift device occupy the open position. Based on the design of the main gear set HRS and the connection of the main gear set HRS to the electric motor EM, this allocation of a total of six shift elements A, B, C, D, E, F to only three shift devices is enabled. This reduced number of shift devices helps to reduce the complexity of the transmission G.

The transmission G features an electric motor EM, whereas a stator S is connected in a torque-proof manner to the transmission housing GG of the transmission G or to another torque-proof component of the transmission G, such that the stator S cannot assume any rotational speed. A rotatably mounted rotor R is connected to a sun gear So-P4 of the planetary gear set P4 of the auxiliary gear set ZRS. The sun gear So-P4 of the planetary gear set P4 of the auxiliary gear set ZRS is a component of a first shaft W2P4 of the auxiliary gear set ZRS. A carrier St-P4 of the planetary gear set P4 of the auxiliary gear set ZRS is a component of a second shaft W2P4 of the auxiliary gear set ZRS, and is connected to the first shaft W1 of the main gear set HRS. A ring gear Ho-P4 of the planetary gear set P4 of the auxiliary gear set ZRS is a component of a third shaft W3P4 of the auxiliary gear set ZRS, and is connected to the third shaft W3 of the main gear set HRS.

Figure 2:
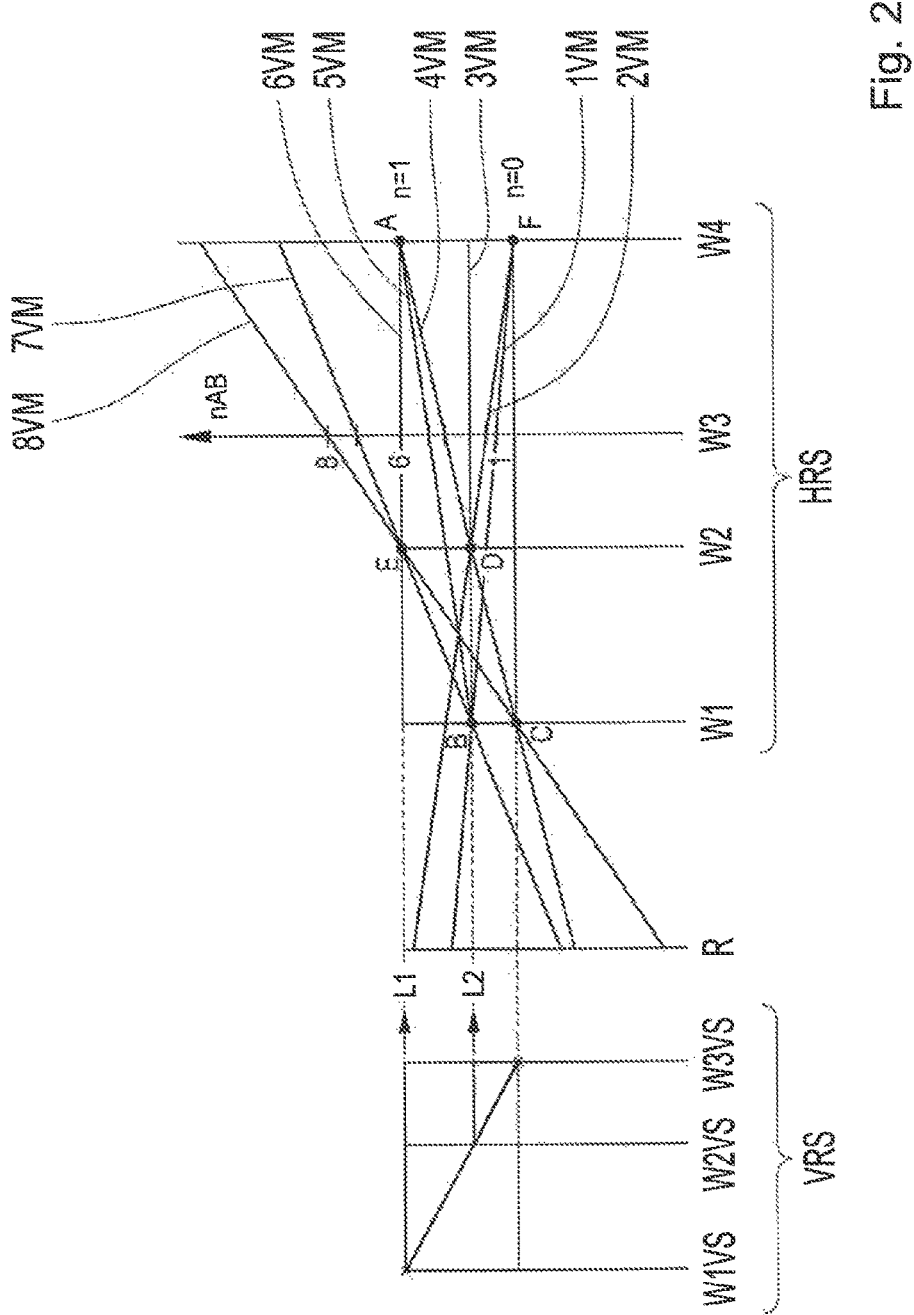
FIG. 2 shows a rotational speed diagram of the transmission in accordance with the first exemplary embodiment.

FIG. 2 shows a rotational speed diagram of the transmission G, while a shifting diagram of the transmission G is shown in FIG. 3. In FIG. 2, the rotational speeds of the four shafts W1, W2, W3, W4 of the main gear set HRS and the rotor R are plotted in a vertical direction in relation to the rotational speed of the transmission input shaft GW1. The maximum arising rotational speed of the transmission input shaft GW1 is normalized to the value of one. The distances between the four shafts W1, W2, W3, W4 of the main gear set HRS and the rotor R arise from the stationary transmission ratios of the first and second planetary gear sets P1, P2 of the main gear set HRS and the stationary transmission ratio of the planetary gear set P4 of the auxiliary gear set ZRS. Rotational speed relationships pertaining to a given operating point can be connected by a straight line.

If two shafts are connected to each other, such shafts connected to each other rotate with the same rotational speed. For reasons of clarity, such connected shafts can be shown separated from each other horizontally in the rotational speed diagram, in order to, for example, better clarify the rotational speed transfer from the upstream gear set VRS through the first or second power paths L1, L2 to the main gear set HRS. The horizontal distance between the connected shafts that is thereby selected in the rotational speed diagram is arbitrary. Of course, the transmission ratio between such connected shafts amounts to the value of one, independent of the horizontal distance selected in the rotational speed diagram.

If, of the ring gear, carrier and sun of a planetary gear set, two of such elements are connected to each other, the ring gear, carrier and sun of such planetary gear set rotate with the same rotational speed. In this state, the transmission ratio relationship between the specified elements assumes the value of one. For reasons of clarity, the horizontal arrangement of the shafts connected to such elements is not shifted in the rotational speed diagram. Consequently, this condition can be seen in the rotational speed diagram by a horizontal straight line, which connects the participating shafts to each other.

FIG. 3 shows a shifting diagram of the transmission G in accordance with the first exemplary embodiment. Through the shifting diagram in FIG. 3 and the rotational speed diagram in FIG. 2, the operation of the second exemplary embodiment of the transmission G becomes clear. The locked shift elements A, B, C, D, E, F are indicated by circles in FIG. 3. By way of example, the respective transmission ratios of the individual gear steps and the gear jumps to the next higher gear to be determined from them may be taken from the shifting diagram, whereas the transmission G in such a way has a spread of 10.1. The transmission ratios arise from the stationary transmission ratios of the planetary gear sets P1, P2, P3, P4. Upon a sequential shifting operation, double gearshifts and group gearshifts can be avoided, since two adjacent gear steps jointly use one shift element. The gears of the transmission G are shown in the various lines of the shifting diagram. One column of the shifting diagram further indicates whether the electric motor EM in the relevant gear is able to deliver mechanical power to the transmission output shaft GW2, or receive mechanical power from it.

A first forward gear 1VM between the transmission input shaft GW1 and the transmission output shaft GW2 arises from the locking of the third shift element B and the sixth shift element F, a second forward gear 2VM arises from the locking of the fourth shift element and the sixth shift element F, a third forward gear 3VM arises from the locking of the third shift element B and the fourth shift element D, a fourth forward gear 4VM arises from the locking of the fourth shift element D and the first shift element A, a fifth forward gear 5VM arises from the locking of the third shift element B and the first shift element A, a sixth forward gear 6VM arises from the locking of the second shift element E and the first shift element A, a seventh forward gear 7VM arises from the locking of the third shift element B and the second shift element E, and an eighth forward gear 8VM arises from the locking of the fifth shift element C and the second shift element E.

In an electric gear 1EM, torque is transferred to transmission output shaft GW2 solely by the electric motor EM, whereas all shift elements except for the sixth shift element F are open, and there is thus no torque-transferring connection between the transmission input shaft GW1 and the transmission output shaft GW2. The electrical gear 1EM also serves as a reverse gear, in which the electric motor EM is driven in such a manner that the rotor R assumes a negative rotational speed; that is, a reverse rotation. Thus, a separate reverse gear is not necessary.

In the first and second start modes 1S, 2S, torque is supplied to the transmission input shaft GW1, whereas, depending on the position of the sixth shift element F, torque can be supplied to the transmission input shaft GW1 exclusively by the electric motor EM or by the transmission output shaft GW2. If the sixth shift element F is locked, and the electric motor EM does not deliver any torque, the transmission input shaft GW1 may also be supplied with torque exclusively by the transmission output shaft GW2. This is particularly relevant when using the transmission G in a motor vehicle, in order to, in such a way, start an internal combustion engine VKM connected to the transmission input shaft GW1. If the sixth shift element F is thereby open, the transmission output shaft GW2 must be fixed in a torque-proof manner by a parking brake.

In the following, a load-shifting process is described by way of example. In the second forward gear, each of the second and the fourth shafts W2, W4 of the main gear set HRS forms a differential shaft, while the third shaft W3 of the main gear set HRS represents a sum shaft. Upon a shifting process from the second forward gear 2VM to the third forward gear 3VM, the fourth shift element D is locked. The sixth shift element F is open; the third shift element B is subsequently locked. If the sixth shift element F is formed as claw-shift element, the sixth shift element F must be made largely free of torque prior to opening, such that the sixth shift element F only transfers no torque or low torque. This load release of the sixth shift element F is effected by a generator torque of the electric motor EM. Thereby, at least one portion of the torque previously applied at the third shaft W3 of the main gear set HRS is maintained by which a complete loss of torque does not arise at the transmission output shaft GW2. If the sixth shift element F is open, the second shaft W2 of the main gear set HRS becomes the sum shaft, while each of the first shaft W1P4 of the auxiliary gear set ZRS and the third shaft W3 of the main gear set HRS forms a differential shaft. Through the electric motor EM, a generator torque is now applied, in order to achieve a synchronization of rotational speeds between the second shaft W2VS of the upstream gear set VRS and the first shaft W1 of the main gear set HRS. This enables a locking of the third shift element B, whereas at least one portion of the torque previously applied at the third shaft W3 of the main gear set HRS is maintained. If the third shift element B is locked, the first shaft W1 of the main gear set HRS becomes the differential shaft; the shifting process is thus completed. This ensures that, during the shifting process, one part of the power flow of the transmission input shaft GW1 at the transmission output shaft GW2 can be maintained. This mode of operation applies to all embodiments.

Figure 4:
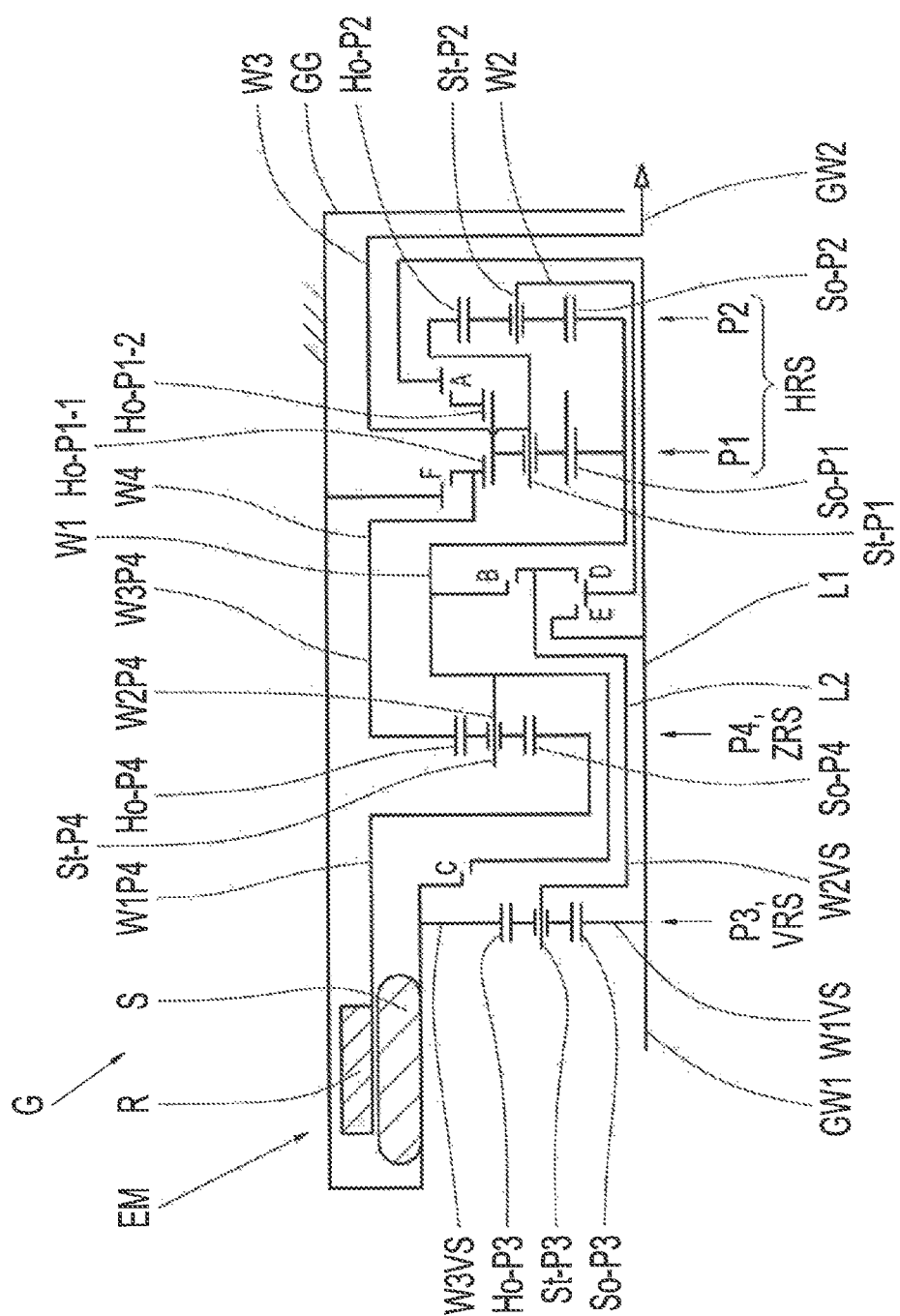
FIG. 4 schematically shows a transmission in accordance with a second exemplary embodiment of the invention.

FIG. 4 schematically shows a transmission G in accordance with a second exemplary embodiment of the invention. In contrast to the first exemplary embodiment, the third shaft W3P4 of the auxiliary gear set ZRS is now no longer connected to the third shaft W3 of the main gear set HRS. Instead, the third shaft W3P4 of the auxiliary gear set ZRS is connected to the fourth shaft W4 of the main gear set HRS. Thereby, the third shaft W3P4 of the auxiliary gear set ZRS is connected to that section of the fourth shaft W4 of the main gear set HRS that is connected to the first segment Ho-P1-1 of the ring gear Ho-P1 of the first planetary gear set P1 of the main gear set HRS. In order to achieve a transmission ratio effect between the rotor R and the four shafts W1, W2, W3, W4 of the main gear set HRS that is the same as in the first exemplary embodiment of the transmission G, the stationary transmission ratio of the planetary gear set P4 of the auxiliary gear set ZRS must be correspondingly adjusted.

Figure 5:
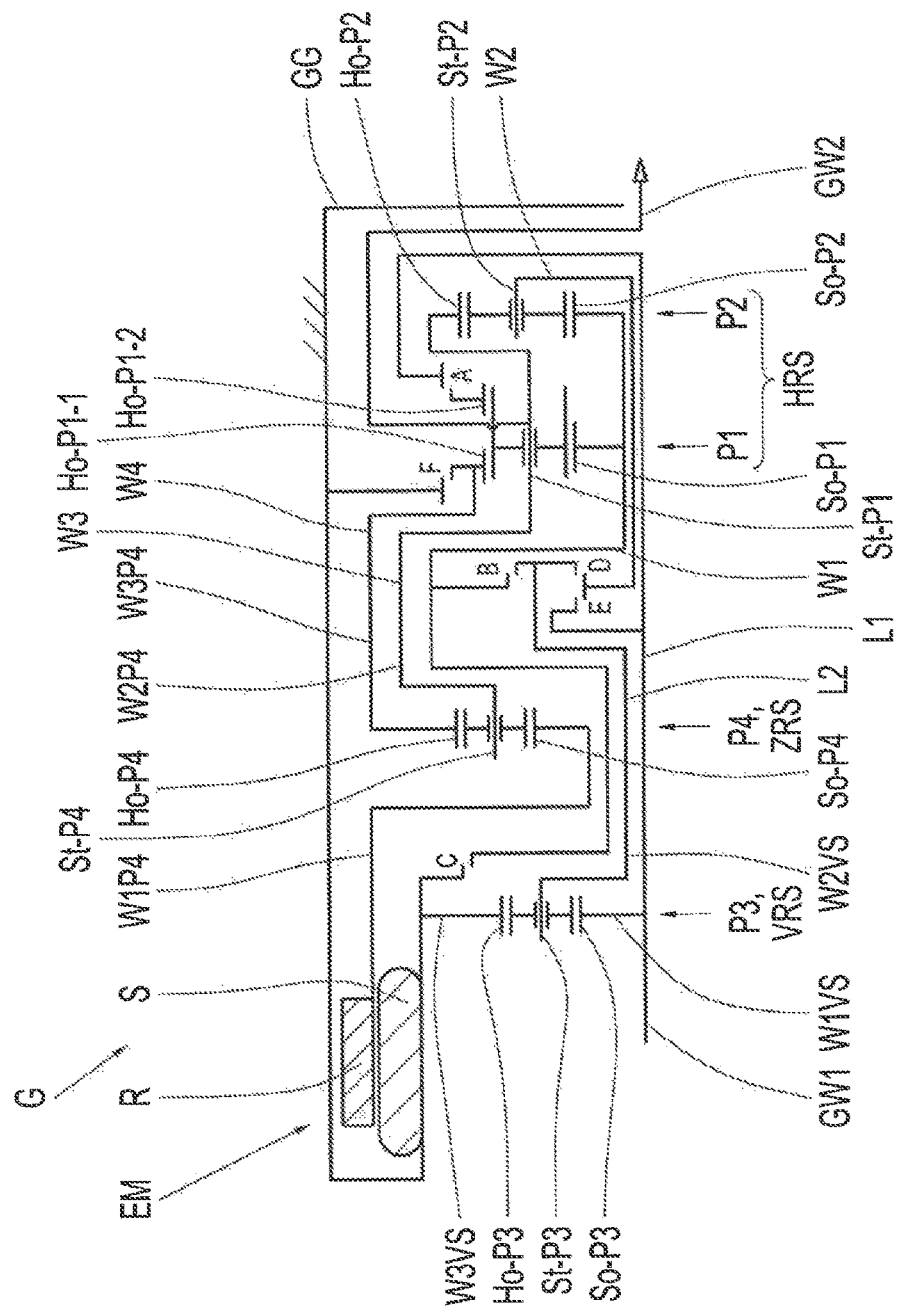
FIG. 5 schematically shows a transmission in accordance with a third exemplary embodiment of the invention.

FIG. 5 schematically shows a transmission G in accordance with a third exemplary embodiment of the invention. In contrast to the second exemplary embodiment, the second shaft W2P4 of the auxiliary gear set ZRS is now no longer connected to the first shaft W1 of the main gear set HRS. Instead, the second shaft W2P4 of the auxiliary gear set ZRS is connected to the third shaft W3 of the main gear set HRS. As in the second exemplary embodiment, the third shaft W3P4 of auxiliary gear set ZRS is connected to the fourth shaft W4 of the main gear set HRS. In the third exemplary embodiment, the first shaft W1 of the main gear set HRS is located in the rotational speed plan between the first shaft W1 P4 of the auxiliary gear set ZRS and the second shaft W2 of the main gear set HRS only if the stationary transmission ratios of the planetary gear set P4 of the auxiliary gear set ZRS and the two planetary gear sets F1, P2 of the main gear set HRS are selected accordingly.

The rotational speed plan in FIG. 2 and the shifting diagram in FIG. 4 also apply to the second and third exemplary embodiments.

Figure 6:
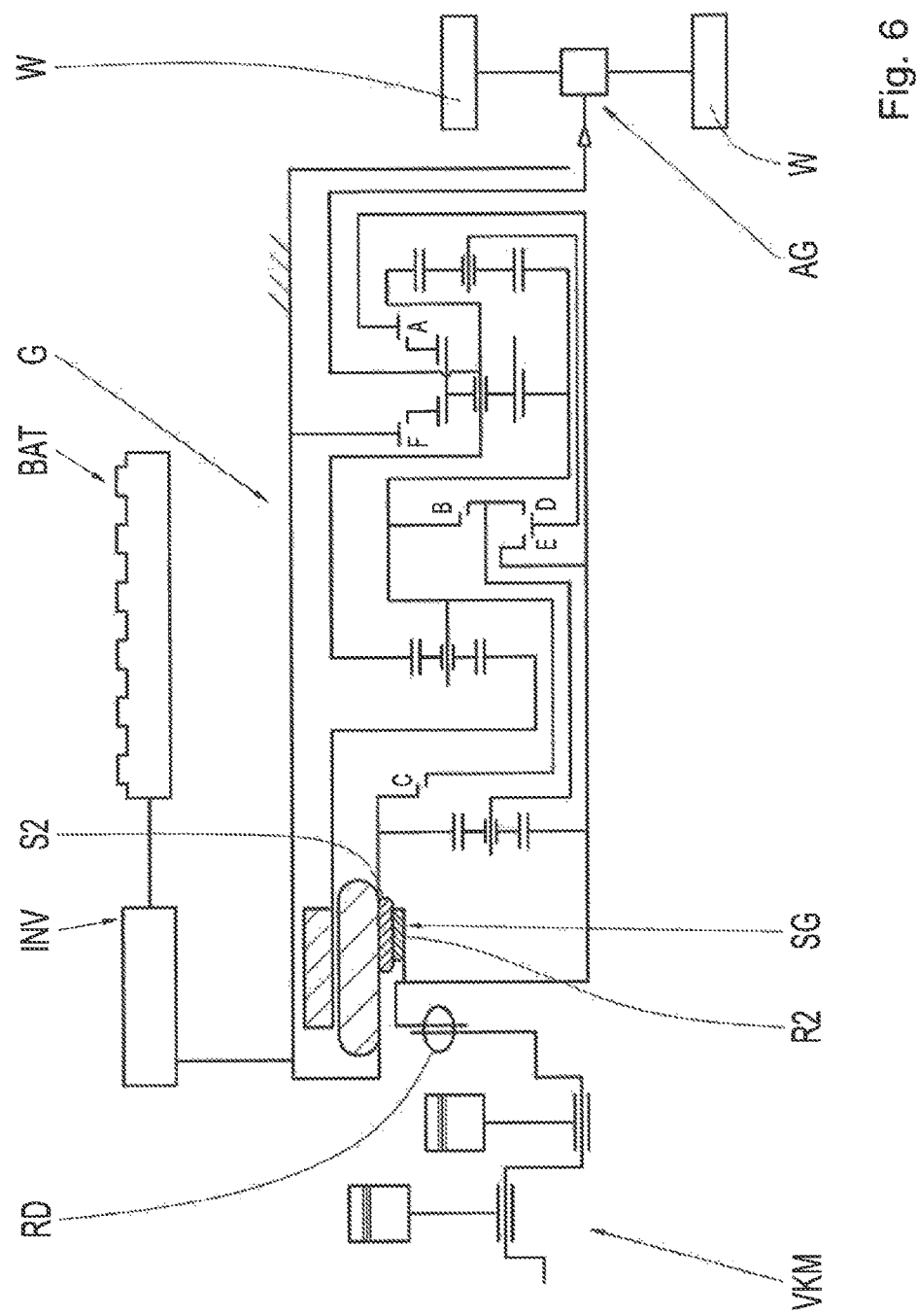
FIG. 6 shows a hybrid drive train of a motor vehicle.

FIG. 6 schematically shows a hybrid drive train of a motor vehicle. The transmission G contained therein corresponds to the first exemplary embodiment of the transmission G, whereas this is to be regarded merely as an example. A rotatable rotor R2 of an auxiliary electric motor SG is connected to the transmission input shaft GW1, while the stator S2 of the auxiliary electric motor SG is fixed in a torque-proof manner to the transmission housing GG of the transmission G or to another torque-proof component of the transmission G. Through a rotational vibration damper RD, an internal combustion engine VKM is connected to the transmission input shaft GW1. The transmission output shaft GW2 is connected to an axle drive AG. Starting from the axle drive AG, the torque that applies at the transmission output shaft GW2 is distributed to wheels W of the motor vehicle. In engine mode of the electric motor EM, electric power is supplied to the stator S through a power inverter INV, In generator mode of the electric motor EM, the stator S supplies electric power to the power inverter INV. Thereby, the power inverter INV converts the DC voltage of a battery BAT into an AC voltage suitable for electric motor EM, and vice versa. Thereby, the auxiliary electric motor SG may likewise be supplied with electric power through the power inverter INV. Alternatively, the auxiliary electric motor SG may also be connected to a different power supply, for example, to a low-voltage electrical system of the motor vehicle.

Modifications and variations can be made to the embodiments illustrated or described herein without departing from the scope and spirit of the invention as set forth in the appended claims.

REFERENCE SIGNS

G Transmission
GW1 Transmission input shaft
GW2 Transmission output shaft
HRS Main gear set
ZRS Auxiliary gear set
VRS Upstream gear set
EM Electric motor
R Rotor of the electric motor
S Stator of the electric motor
SG Auxiliary electric motor
R2 Rotor of the auxiliary electric motor
S2 Stator of the auxiliary electric motor
RD Rotational vibration damper
VKM Internal combustion engine
INV Power inverter
BAT Battery
P1 First planetary gear set of the main gear set
P2 Second planetary gear set of the main gear set
P3 Planetary gear set of the upstream gear set
P4 Planetary gear set of the auxiliary gear set
W1 First shaft of the main gear set
W2 Second shaft of the main gear set
W3 Third shaft of the main gear set
W4 Fourth shaft of the main gear set
W1VS First shaft of the upstream gear set
W2VS Second shaft of the upstream gear set
W3VS Third shaft of the upstream gear set
W1P4 First shaft of the auxiliary gear set
W2P4 Second shaft of the auxiliary gear set
W3P4 Third shaft of the auxiliary gear set
A First shift element
E Second shift element
B Third shift element
Fourth shift element
C Fifth shift element
F Sixth shift element
So-P1 Sun gear of the first planetary gear set of the main gear set
St-P1 Carrier of the first planetary gear set of the main gear set
Ho-P1 Ring gear of the first planetary gear set of the main gear set
Ho-P1-1 First segment
Ho-P1-2 Second segment
So-P2 Sun gear of the second planetary gear set of the main gear set
St-F2 Carrier of the second planetary gear set of the main gear set
Ho-P2 Ring gear of the second planetary gear set of the main gear set
So-F3 Sun gear of the planetary gear set of the upstream gear set
St-P3 Carrier of the planetary gear set of the upstream gear set
Ho-F3 Ring gear of the planetary gear set of the upstream gear set
So-P4 Sun gear of the planetary gear set of the auxiliary gear set
St-P4 Carrier of the planetary gear set of the auxiliary gear set
Ho-P4 Ring gear of the planetary gear set of the auxiliary gear set
L1 First power path
L2 Second power path
1VM-8VM First to eighth forward gears
1EM Electric gear
1S First start mode
2S Second start mode
AG Axle drive
W Wheel

The invention claimed is:

1. A transmission, comprising:
a transmission input shaft;
a transmission output shaft;
a main gear set, a first power path and a second power path formed between the transmission input shaft and the main gear set, the main gear set comprising a first planetary gear set, a second planetary gear set and four shafts, a third shaft of the main gear set connected to the transmission output shaft;
a first shift element, the first power path connectable through the first shift element to a fourth shaft of the main gear set;
a second shift element, the first power path connectable through the second shift element to a second shaft of the main gear set;
a third shift element, the second power path connectable through the third shift element to a first shaft of the main gear set;
a fourth shift element, the second power path connectable through the fourth shift element to the second shaft of the main gear set;

an auxiliary gear set, the auxiliary gear set comprising a planetary gear set and three shafts; and an electric motor having a rotor and a stator, a first shaft of the auxiliary gear set connected to the rotor, wherein a second shaft of the auxiliary gear set is constantly connected to the first shaft of the main gear set, and wherein a third shaft of the auxiliary gear set is constantly connected to the third shaft of the main gear set.

2. The transmission of claim 1, wherein, when the second shaft of the auxiliary gear set is connected to the third shaft of the main gear set, a stationary transmission ratio of the planetary gear set of the auxiliary gear set selected such that the first shaft of the main gear set is located between the first shaft of the auxiliary gear set and the second shaft of the main gear set in a rotational speed diagram.

3. The transmission of claim 1, wherein:
a sun gear of the planetary gear set of the auxiliary gear set is a component of the first shaft of the auxiliary gear set;
when the planetary gear set of the auxiliary gear set is a negative gear set, a carrier of the planetary gear set of the auxiliary gear set is a component of the second shaft of the auxiliary gear set, and a ring gear of the planetary gear set of the auxiliary gear set is a component of the third shaft of the auxiliary gear set; and
when the planetary gear set of the auxiliary gear set is a positive gear set, the ring gear of the planetary gear set of the auxiliary gear set is a component of the second shaft of the auxiliary gear set, and the carrier of the planetary gear set of the auxiliary gear set is a component of the third shaft of the auxiliary gear set.

4. The transmission of claim 1, further comprising a fifth shift element and a sixth shift element, the first shaft of the main gear set fixable in a torque-proof manner through the fifth shift element, and the fourth shaft of the main gear set fixable in a torque-proof manner through the sixth shift element.

5. The transmission of claim 4, wherein the first, second, third, fourth, fifth and sixth shift elements are claw-shift elements.

6. The transmission of claim 4, wherein, through selective closing of the first, second, third, fourth, fifth and sixth shift elements in pairs, eight forward gears are realizable, a first forward gear arising from locking of the third shift element and the sixth shift element, a second forward gear arising from locking of the fourth shift element and the sixth shift element, a third forward gear arising from locking of the third shift element and the fourth shift element, a fourth forward gear arising from locking of the fourth shift element and the first shift element, a fifth forward gear arising from locking of the third shift element and the first shift element, a sixth forward gear arising from locking of the second shift element and the first shift element, a seventh forward gear arising from locking of the third shift element and the second shift element, and an eighth forward gear arising from locking of the fifth shift element and the second shift element.

7. The transmission of claim 1, wherein:
the first and second planetary gear sets of the main gear set are negative gear sets;
the first shaft of the main gear set is connected to a sun gear of the first planetary gear set of the main gear set and to a sun gear of the second planetary gear set of the main gear set;
the second shaft of the main gear set is connected to a carrier of the second planetary gear set of the main gear set;
the third shaft of the main gear set is connected to a carrier of the first planetary gear set of the main gear set and to a ring gear of the second planetary gear set of the main gear set; and
the fourth shaft of the main gear set is connected to a ring gear of the first planetary gear set of the main gear set.

8. The transmission of claim 7, wherein the ring gear of the first planetary gear set of the main gear set comprises a first segment and a second segment.

9. The transmission of claim 8, wherein one section of the third shaft of the main gear set is arranged between the first and second segments of the ring gear of the first planetary gear set of the main gear set such that the one section of the third shaft of the main gear set between the first and second segments is movable radially outwards.

10. The transmission of claim 1, wherein:
the planetary gear set of the auxiliary gear set and the first and second planetary gear sets of the main gear set are negative gear sets;
a sun gear of the planetary gear set of the auxiliary gear set is a component of the first shaft of the auxiliary gear set and is connected to the rotor;
a carrier of the planetary gear set of the auxiliary gear set is connected to a sun gear of the first planetary gear set of the main gear set and to a sun gear of the second planetary gear set of the main gear set such that the carrier of the planetary gear set of the auxiliary gear set is a component of the second shaft of the auxiliary gear set and the first shaft of the main gear set;
a ring gear of the planetary gear set of the auxiliary gear set is connected to a carrier of the first planetary gear set of the main gear set and to a ring gear of the second planetary gear set of the main gear set such that the ring gear of the planetary gear set of the auxiliary gear set is a component of the third shaft of the auxiliary gear set, the third shaft of the main gear set and the transmission output shaft;
a ring gear of the first planetary gear set of the main gear set is a component of the fourth shaft of the main gear set; and
a carrier of the second planetary gear set of the main gear set is a component of the second shaft of the main gear set.

11. The transmission of claim 1, wherein:
the planetary gear set of the auxiliary gear set and the first and second planetary gear sets of the main gear set are negative gear sets;
a sun gear of the planetary gear set of the auxiliary gear set is a component of the first shaft of the auxiliary gear set and is connected to the rotor;
a carrier of the planetary gear set of the auxiliary gear set is connected to a sun gear of the first planetary gear set of the main gear set and to a sun gear of the second planetary gear set of the main gear set such that the carrier of the planetary gear set of the auxiliary gear set is a component of the second shaft of the auxiliary gear set and the first shaft of the main gear set;
a ring gear of the planetary gear set of the auxiliary gear set is connected to a ring gear of the first planetary gear set of the main gear set such that the ring gear of the planetary gear set of the auxiliary gear set is a component of the third shaft of the auxiliary gear set and the fourth shaft of the main gear set;

a carrier of the second planetary gear set of the main gear set is a component of the second shaft of the main gear set; and a carrier of the first planetary gear set of the main gear set is connected to a ring gear of the second planetary gear set of the main gear set such that the carrier of the first planetary gear set of the main gear set is a component of the third shaft of the main gear set and the transmission output shaft.

12. The transmission of claim 1, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a carrier of the first planetary gear set of the main gear set and to a ring gear of the second planetary gear set of the main gear set such that the carrier of the planetary gear set of the auxiliary gear set is a component of the second shaft of the auxiliary gear set, the third shaft of the main gear set and the transmission output shaft;

a ring gear of the planetary gear set of the auxiliary gear set is connected to a ring gear of the first planetary gear set of the main gear set such that the ring gear of the planetary gear set of the auxiliary gear set is a component of the third shaft of the auxiliary gear set and the fourth shaft of the main gear set;

a sun gear of the first planetary gear set of the main gear set is connected to a sun gear of the second planetary gear set of the main gear set such that the sun gear of the first planetary gear set of the main gear set is a component of the first shaft of the main gear set; and a carrier of the second planetary gear set of the main gear set is a component of the second shaft of the main gear set.

13. The transmission of claim 12, wherein stationary transmission ratios of the planetary gear set of the auxiliary gear set and of the first and second planetary gear sets of the main gear set are selected such that the first shaft of the main gear set is located between the first shaft of the auxiliary gear set and the second shaft of the main gear set in a rotational speed diagram.

14. A hybrid drive train for a motor vehicle, comprising at least one internal combustion engine and the transmission of claim 1.

15. The hybrid drive train of claim 14, further comprising at least one auxiliary electric motor connected to the internal combustion engine directly or through the transmission, the at least one auxiliary electric motor configured to start the internal combustion engine, the rotor of the auxiliary electric motor connected to the transmission input shaft of the transmission.

16. A drive train for an electric vehicle, comprising the transmission of claim 1.

17. A transmission, comprising:

a transmission input shaft;

a transmission output shaft;

a main gear set, a first power path and a second power path formed between the transmission input shaft and the main gear set, the main gear set comprising a first planetary gear set, a second planetary gear set and four shafts, a third shaft of the main gear set connected to the transmission output shaft;

a first shift element, the first power path connectable through the first shift element to a fourth shaft of the main gear set;

a second shift element, the first power path connectable through the second shift element to a second shaft of the main gear set;

a third shift element, the second power path connectable through the third shift element to a first shaft of the main gear set;

a fourth shift element, the second power path connectable through the fourth shift element to the second shaft of the main gear set;

an auxiliary gear set, the auxiliary gear set comprising a planetary gear set and three shafts; and an electric motor having a rotor and a stator, a first shaft of the auxiliary gear set connected to the rotor, wherein a second shaft of the auxiliary gear set is constantly connected to the first shaft of the main gear set, and wherein a third shaft of the auxiliary gear set is constantly connected to the fourth shaft of the main gear set.

18. A transmission, comprising:

a transmission input shaft;

a transmission output shaft;

a main gear set, a first power path and a second power path formed between the transmission input shaft and the main gear set, the main gear set comprising a first planetary gear set, a second planetary gear set and four shafts, a third shaft of the main gear set connected to the transmission output shaft;

a first shift element, the first power path connectable through the first shift element to a fourth shaft of the main gear set;

a second shift element, the first power path connectable through the second shift element to a second shaft of the main gear set;

a third shift element, the second power path connectable through the third shift element to a first shaft of the main gear set;

a fourth shift element, the second power path connectable through the fourth shift element to the second shaft of the main gear set;

an auxiliary gear set, the auxiliary gear set comprising a planetary gear set and three shafts; and an electric motor having a rotor and a stator, a first shaft of the auxiliary gear set connected to the rotor, wherein a second shaft of the auxiliary gear set is constantly connected to the third shaft of the main gear set, and wherein the third shaft of the auxiliary gear set is constantly connected to the fourth shaft of the main gear set.

19. The transmission of claim 17, wherein:

the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a sun gear of the first planetary gear set of the main gear set and to a sun gear of the second planetary gear set of the main gear set such that the carrier of the planetary gear set of the auxiliary gear set is a component of the second shaft of the auxiliary gear set and the first shaft of the main gear set;

a ring gear of the planetary gear set of the auxiliary gear set is connected to a ring gear of the first planetary gear set of the main gear set such that the ring gear of the planetary gear set of the auxiliary gear set is a component of the third shaft of the auxiliary gear set and the fourth shaft of the main gear set;

a carrier of the second planetary gear set of the main gear set is a component of the second shaft of the main gear set; and a carrier of the first planetary gear set of the main gear set is connected to a ring gear of the second planetary gear set of the main gear set such that the carrier of the first planetary gear set of the main gear set is a component of the third shaft of the main gear set and the transmission output shaft.

20. The transmission of claim 18, wherein, when the second shaft of the auxiliary gear set is connected to the third shaft of the main gear set, a stationary transmission ratio of the planetary gear set of the auxiliary gear set selected such that the first shaft of the main gear set is located between the first shaft of the auxiliary gear set and the second shaft of the main gear set in a rotational speed diagram.

21. The transmission of claim 18, wherein:
the planetary gear set of the auxiliary gear set and the first and second planetary gear sets of the main gear set are negative gear sets;

a sun gear of the planetary gear set of the auxiliary gear set is a component of the first shaft of the auxiliary gear set and is connected to the rotor;

a carrier of the planetary gear set of the auxiliary gear set is connected to a carrier of the first planetary gear set of the main gear set and to a ring gear of the second planetary gear set of the main gear set such that the carrier of the planetary gear set of the auxiliary gear set is a component of the second shaft of the auxiliary gear set, the third shaft of the main gear set and the transmission output shaft;

a ring gear of the planetary gear set of the auxiliary gear set is connected to a ring gear of the first planetary gear set of the main gear set such that the ring gear of the planetary gear set of the auxiliary gear set is a component of the third shaft of the auxiliary gear set and the fourth shaft of the main gear set;

a sun gear of the first planetary gear set of the main gear set is connected to a sun gear of the second planetary gear set of the main gear set such that the sun gear of the first planetary gear set of the main gear set is a component of the first shaft of the main gear set; and a carrier of the second planetary gear set of the main gear set is a component of the second shaft of the main gear set.

22. The transmission of claim 21, wherein stationary transmission ratios of the planetary gear set of the auxiliary gear set and of the first and second planetary gear sets of the main gear set are selected such that the first shaft of the main gear set is located between the first shaft of the auxiliary gear set and the second shaft of the main gear set in a rotational speed diagram.

* * * * *